United States Patent [19]

Cargnel et al.

[11] Patent Number: 5,192,843

[45] Date of Patent: Mar. 9, 1993

[54] PIN ATTACHMENT TOOL AND METHOD OF CAPACITIVE BRAZING

[75] Inventors: Robert A. Cargnel, Export; James R. Morran, Apollo, both of Pa.

[73] Assignee: Aluminum Company of America, Pittsburgh, Pa.

[21] Appl. No.: 669,649

[22] Filed: Mar. 14, 1991

[51] Int. Cl.$^5$ .............................................. B23K 1/00
[52] U.S. Cl. ................................ 219/56.22; 219/85.15; 219/85.18; 219/113
[58] Field of Search .................... 219/56.21, 56.22, 113, 219/85.14, 85.15, 85.18

[56] References Cited

U.S. PATENT DOCUMENTS

| | | | |
|---|---|---|---|
| 3,394,240 | 7/1968 | Broomhall | 219/113 |
| 3,459,918 | 8/1969 | Rzant | 219/56.22 |
| 3,500,013 | 3/1970 | Suel et al. | 219/56.22 |
| 3,605,234 | 9/1971 | Bogursky | 29/203 H |
| 4,014,729 | 3/1977 | Dybwad | 219/113 |
| 4,131,982 | 1/1979 | Rose et al. | 29/566 |
| 4,206,543 | 6/1980 | Chisholm | 29/739 |
| 4,631,817 | 12/1986 | Bailey et al. | 29/747 |
| 4,632,294 | 12/1986 | Druschel et al. | 228/119 |

Primary Examiner—Clifford C. Shaw
Attorney, Agent, or Firm—David W. Pearce-Smith

[57] ABSTRACT

A method is provided to replace a damaged pin in a module for an integrated circuit assembly without damaging the circuit device or chip mounted in a circuitized substrate. This method comprises brazing a new pin to the base of the old pin by capacitive discharge brazing with a ribbon of compatible metal foil, requiring no flux, and is effected by firing the charge by completing a circuit which includes a pin attachment tool, the ribbon and the power supply, but in which circuit the chip is bypassed. The arc is struck and the new pin is brazed to the old without generating sufficient heat to damage the chip, and without conducting any current through the chip. The attachment tool is uniquely adapted to clamp the new pin and locate the pin precisely over the base of the old pin.

17 Claims, 4 Drawing Sheets

PIN ATTACHMENT TOOL AND METHOD OF CAPACITIVE BRAZING

BACKGROUND OF THE INVENTION

An integrated circuit device, commonly referred to as a "microchip" or "chip", is usually mounted in an integrated circuit assembly or "module" comprising the chip and an array of plural pins protruding from an electrically insulating substrate. The module is deliberately configured to extract heat generated by the chip during use, efficiently. As is well known, efficiently dissipating such heat has presented a significant limitation on the speed and power capabilities of an integrated circuit package. Therefore, an integrated circuit assembly is constructed so that there is essentially no thermal or electrical resistance between the chip and the pins to which it is connected.

The foregoing attention to extraction and dissipation of heat generated by the integrated circuit device generally ignores the other side of the coin, namely, that heat and/or an electrical current generated at a pin, or at the base of a pin on the substrate, will travel to the integrated circuit device with equal facility and efficiency. The simple reason for ignoring the other side is that one normally has no occasion to indulge such a consideration, and of course, the problem simply does not arise.

The problem does arise however, on the relatively infrequent occasions when a pin on the substrate is damaged, and one considers replacing the pin, rather than discarding the entire module. The latter course is generally the more economical since the cost of the undamaged module is usually less than the cost of attempting to repair it, even if it was known how to repair it, and repairing it was practical.

In those instances where the cost of the module is quite significant, it behooves one to consider solving the problem of repairing a defective module, particularly replacing a damaged pin, without impairing the operating capabilities of the integrated circuit device.

The problem becomes more acute when a pin is found to be damaged in a multi-chip module where several chips are bonded to a single substrate. A common requirement is that different chips are biased at different electrical potentials, so they cannot be commoned to a single point. However, whatever the differences in the electrical potentials, none can tolerate a surge of either heat or electrical current, even if the surge is relatively small. This problem accounts for the absence in a module of any sort of metal cover which might be used to dissipate heat if the cover could be metallurgically joined to pins on the substrate, on the rear side thereof, relative to the side on which the chip is connected.

As will be readily appreciated, a metallurgical joint, must necessarily be made if a broken pin is to be replaced. The broken pin would have to be cleanly machined at its base in the substrate, and the joint would have to be made between the base of a replacement ("new") pin and the corresponding base of the damaged pin (referred to as the "old base") in the substrate. The joint could be made by "capacitive discharge welding", namely, by discharging a stored electrical charge between the electrode (the replacement pin which would be held in an appropriate device) and the "work" (the old base); optionally, the weld could be made by inserting an appropriate filler alloy between the electrode and the work. However, the chip is thus placed in the circuit and, upon firing the charged capacitor, the chip would be, and is found to be, irretrievably damaged.

It thus becomes evident that the work must be left out of the circuit. The obvious way to do so is to use a "capacitive discharge fusion" method. In such a method one places only a consumable compatible metal foil in the circuit with the capacitive discharge welder, positioning the foil over the old base, then fuses the foil by superimposing the replacement pin on the consumable foil, and firing the charge so as to melt the foil. If the material of the foil is chosen with due care and attention to the metallurgical requirements of the old base and the base of the replacement pin (typically the old base and new pin are the same material), as it should be, one would expect to make an acceptable joint. Except that the heat generated during fusion destroys the integrated circuit device.

We solved the problem by keeping the work out of the circuit, and by using a "capacitive brazing method" which makes the new pin, preferably, the positive electrode, and by using a ribbon of consumable foil of brazing alloy as the negative electrode. A flux is unnecessary. The method of this invention is therefore also referred to as "fluxless capacitive discharge brazing". When the charge on the capacitor is fired by contacting the pin and the foil, after the foil is first positioned accurately over the old base, an arc is drawn between the electrode (base of the new pin) and the foil, melting the foil over so short an interval of time that there ins't sufficient heat transmitted to the chip to damage it, and of course, since the work is out of the circuit, no electrical current is transmitted to the supersensitive chip.

Concisely stated, the problem is to make an electrically conductive metal-to-metal joint between an old base and a new pin without generating enough heat, and without conducting sufficient current, through the chip(s) mounted in the module. The solution, described herebelow, is to make the joint by fluxless capacitive brazing, utilizing a tool uniquely adapted for the purpose.

SUMMARY OF THE INVENTION

A method for capacitive brazing has been discovered which allows a single damaged pin in an array of pins in an integrated circuit assembly ("module") to be replaced without damaging the integrated circuit device ("chip") mounted in the module.

It is therefore a general object of this invention to provide a method for capacitive brazing the base of a replacement ("new") pin to the remaining base ("old base") of a pin damaged so badly as to preclude the use of the module.

It is a specific object of this invention to provide a "capacitive discharge brazing" method in which the new pin is the positive electrode of a circuit powered by a high capacitance capacitor which is discharged to a ribbon of consumable foil, the ribbon being the negative electrode. When the charge is fired, it initiates an arc solely between the ribbon and the new pin, the arc being of sufficient intensity to braze the new pin to the old base (remaining after the removal of a damaged pin in a module), yet of insufficient intensity to damage the chip in the module.

It is another specific object of this invention to provide a method for replacing a damaged pin, separated near its base from the substrate in a module for an integrated circuit assembly including at least one, and typically plural circuit device(s) mounted on a circularized substrate, with a new pin, said method comprising,
(a) locating a terminal portion of a ribbon of brazing alloy above and in close proximity to the base,
(b) matingly locating undamaged pins in the module to position the head of the new pin above the terminal portion of the ribbon,
(c) establishing an electrically conductive path from the ribbon to the negative terminal of a power supply,
(d) establishing an electrically conductive path from the new pin to the positive terminal of the power supply,
(e) maintaining the head of the new pin and the terminal portion of the ribbon at a distance insufficient to fire a capacitive charge stored in the power supply, and,
(f) decreasing the distance so as to fire the charge, while leaving said old base out of the circuit for firing the charge,
whereby the ribbon is melted, brazing the head of the new pin to the old base without damaging the integrated circuit.

It has been also been discovered that practicing the capacitive discharge brazing method described hereinabove requires a specially constructed attachment tool which accurately positions the new pin by being matingly connected to at least two pins adjacent the old base, and which tool functions as a combination vise for both the new pin and the ribbon of consumable foil.

It is therefore a general object of this invention to provide an attachment tool for capacitive brazing a new pin to the old base which remains after a damaged pin is removed from the array on a substrate of the module.

It is a specific object of this invention to provide an attachment tool comprising only three essential elements, namely a pin vise having an expansible throat in its lower end adapted to tightly hold the body of a pin, a stepped sleeve through which the pin vise is inserted, and an annular collar adapted to tightly engage the lower portion of the stepped sleeve and hold the ribbon therebetween. Preferably, the pin is initially manually clamped in position before the other components of the attachment tool are assembled for use, by a knurled ring on the handle of the tool.

It is also a specific object of this invention to provide an attachment tool for attaching a new pin to a base of an old pin removed from a circuitized substrate in a module for an integrated circuit assembly including at lest one circuit device mounted on said substrate, comprising,
(a) a pin vise comprising an upper body in electrical contact with a pin-clamping means having a tapered lower body terminating in a clamping means having an axial throat in which the new pin is removably disposed;
(b) a stepped sleeve means having an upper bore in an upper sleeve body, and a lower bore in a lower sleeve body, the upper bore being dimensioned to provide sufficient radially inward axial pressure when the sleeve is advanced upwards over the pin-clamping means, to snugly secure the new pin; and,
a locating collar having an internal, axially tapered through-bore having a relatively larger diameter at the top and a relatively smaller diameter at the bottom, the collar being provided with four longitudinal passages circumferentially spaced-apart so as to mate with at least two pins the taper being adapted to removably secure a ribbon of brazing alloy between the collar and the outer surface of the lower sleeve body.

It is another specific object of this invention to provide a repaired module which, due to a damaged pin, would have to be discarded because it could not function, which module is distinguishable from an undamaged and unrepaired one in that at least one pin has been attached to the substrate by capacitive brazing. That the pin was repaired is visible by microscopic examination at the attachment point, namely the location of the bond between the old damaged pin and the new pin. Yet the bond is so strong that an attempt to break the bond by pulling upon the pin, severs the substrate rather than break the bond.

BRIEF DESCRIPTION OF THE DRAWING

The foregoing and other objects and advantages of the invention will be more fully understood in conjunction with the following detailed description of the invention and in the attached drawings in which like numerals refer to like structural components, and in which:

FIG. 3 is a more detailed elevation view in which the spacing between the locating collar and the stepped sleeve is exaggerated, and showing the particular components of the circuit utilized in the capacitive discharge brazing method.

FIG. 1A is an enlarged view of the lower portion of the outwardly tapered lower portion of a pin clamp, and a half cross-section of a stepped sleeve (the other half secures a ribbon of consumable foil against the pin clamp) showing their relative positions just prior to firing of a charge.

DETAILED DESCRIPTION OF A PREFERRED EMBODIMENT

Fluxless capacitive discharge brazing is a novel process for brazing a pin to a substrate with DC power which generates an arc between the brazing alloy in the form of a foil (negative electrode) and a pin (positive electrode), the arc being produced by a rapid discharge of stored electrical energy from a capacitor. Though the electrodes may be interchanged in the circuit, that is, the pin made the negative electrode, and the foil the positive, the process is greatly more effective in the earlier stated opposite configuration. The process uses a conventional electric storage system as a power source in which the brazing energy is stored, as one would expect, in a high capacitance capacitor.

Figures 1, 2:
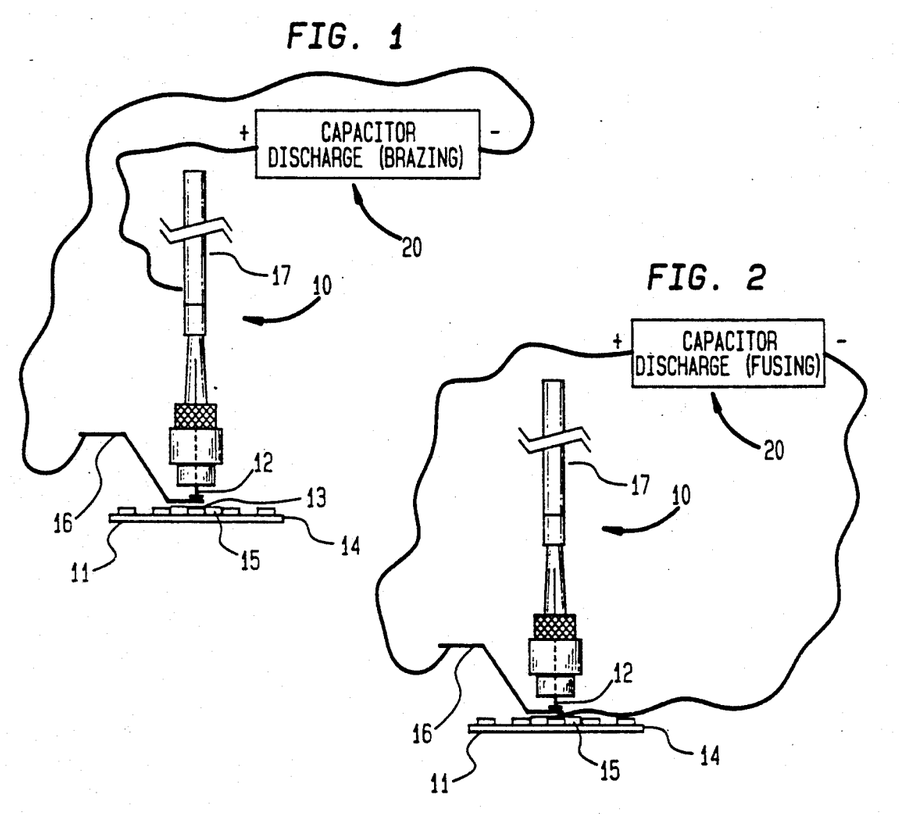
FIG. 1 is an elevation view schematically illustrating the circuit utilized in a system for the capacitive discharge brazing method of this invention.
FIG. 2 is an elevation view schematically illustrating the circuit utilized in a capacitive discharge fusion method.

In the specific instance illustrated in Fig there is illustrated a system, indicated generally by reference numeral 10, in the capacitive brazing mode. A module 11 is to have a replacement (new) pin 12 brazed to the old base 13 remaining in the lower surface of substrate 14 of the module 11. The module has a chip 15 embedded in it, on the upper surface of the substrate 14. In the drawing the chip is shown as a dotted line because the chip is mounted on the lower surface within rectangular peripheral walls of the module, one of which walls is shown. The position for mounting the chip is optional, and it could be mounted on the upper surface in a different configuration.

The old base 13 is prepared with a flat surface after the damaged pin (not shown) has been machined away. The new pin 12, held vertically with its head down in an attachment tool referred to as a pin vise 17, is positioned over a consumable thin foil of brazing alloy in the form of a ribbon of foil 16.

The foil ranges in thickness from about 1 mil to about 20 mils, preferably about 2–5 mils thick, leaving a gap from about 0.005" (inch) to about 0.050" between the ribbon, which rests in contact with the old base, and the pin. This leaves the old base (the work) out of the circuit completed by connecting the pin vise 17 and ribbon to the positive and negative terminals respectively of a capacitive discharge power supply, indicated generally by reference numeral 20, and forcing the new pin in contact with the ribbon. The arc is initiated in the gap between the ribbon and the base of the new pin just before it comes into contact with the ribbon, thus firing the charge in the capacitor of the power supply 20. The pin 12 does not contact the work (old base) until the arc is dissipated.

It is essential that the material of the ribbon be chosen so that its melting point is lower than that of the material used for the new pin, or that of the damaged pin. Typically, the material of the new pin and the old pin is the same, but may be different. The heat generated by the arc is no more than is necessary to melt the foil and "wet" both the pin and the old pin base, but not enough deleteriously to affect the chip 15. The amount of heat generated is therefore controlled, and successfully effects the requisite "wetting" of new pin and old pin base only because the melting point of the ribbon is relatively low, typically in the range from about 600° C. to about 800° C.

Referring now to FIG. 2 there is shown the system 10 in the fusing mode, with the ribbon of foil 16, superimposed in contact upon the old base 13 but, unlike in FIG. 1, opposite ends of the ribbon are connected to the positive and negative terminals of the power supply 20. Both the pin vise 17 and the module 11 are now out of the circuit when the charge is fired. When a charge of sufficient intensity only to melt the foil is fired, there is no arc generated, but the molten metal transmits sufficient heat to the old base to melt its surface layer to a depth which transmits so much heat to the chip as to damage it.

Figure 3:
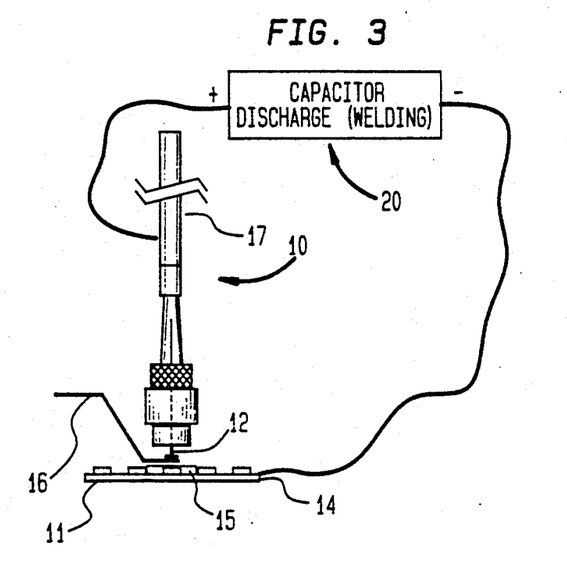
FIG. 3 is an elevation view schematically illustrating the circuit utilized in a prior art system for the capacitive discharge welding method.

Referring now to FIG. 3 there is shown the system 10 in the welding mode, wherein the ribbon of foil 16 is superimposed in contact upon the old base 13 but, unlike in FIGS. 1 and 2, neither end of the ribbon is connected to the power supply. Instead the negative terminal is connected to the old base 13, and the positive terminal is connected to the pin vise 17. This circuit in which the current passes through the new pin and the old base in the substrate is conventionally used for capacitive welding. Firing the charge in this circuit, passes the current through the chip and destroys it.

Figure 4:
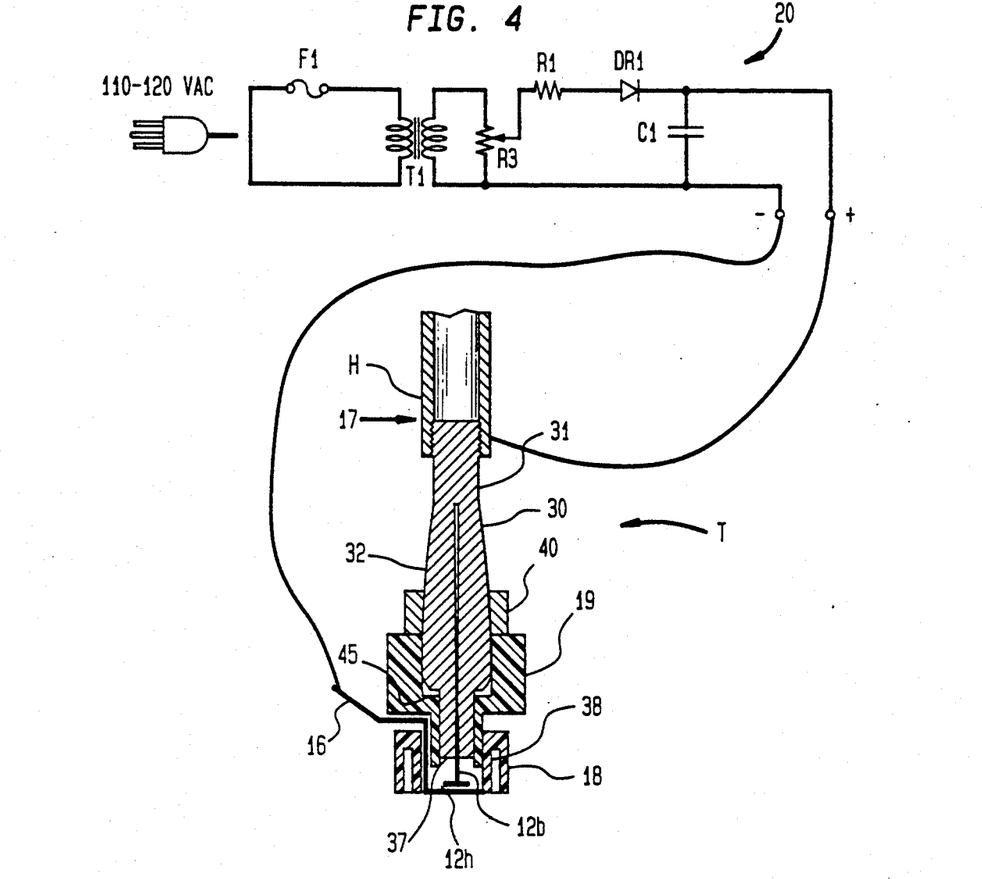
Figure 4A:
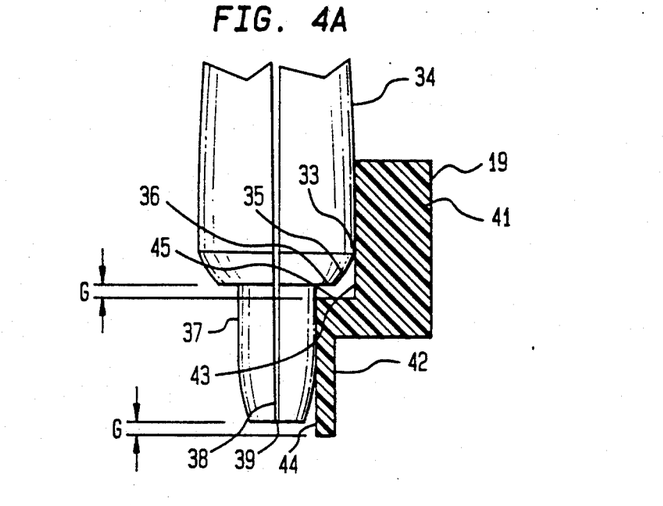

A more detailed elevational view of the capacitive brazing system 10 is provided in FIG. 4 in which is schematically illustrated the components of the attachment tool, indicated generally by T. Components of the tool cooperate with the pin vise 17 to discharge the function of the attachment tool T which comprises, the pin vise 17, a locating collar 18, and a stepped sleeve 19 held between the pin vise and the locating collar. The lower portion 32 of the pin vise 17 is dual-tapered, hence referred to as the dual-tapered lower portion (or "dual-tapered" portion) 32.

The stepped sleeve 19 comprises an upper body portion 41 and a lower body portion 42. The upper sleeve body 41 is dimensioned so that it may be tightly fitted over the dual-tapered lower portion 32. The dual-tapered portion is machined to accommodate a predetermined downward force exerted on the pin vise, as is explained in greater detail herebelow.

The pin vise 17 is preferably steel or other electrically conductive material, but the locating collar 18 and the stepped sleeve 19 are each made from an electrically insulating material, preferably a non-conductive synthetic resinous material such as nylon, polyolefin or polycarbonate.

The pin vise 17 is provided with a handle H in the form of a cylindrical, preferably thick walled tubular body into which is threadedly inserted a pin-clamping means 30. The function of the pin-clamping means is to clamp the pin 12 by its body 12b, in a vertical position, with its head 12h in a downward position. The pin-clamping means 30 includes a cylindrical upper portion 31 and the dual-tapered lower portion 32 which is oppositely tapered above and below the base 33, this lower portion being formed with an outwardly tapered upper portion 34, and an inwardly tapered lower portion 35, each of which portions is gently flared inward and outward, respectively, from the base (which determines the maximum diameter of the pin-clamping means 30). The arc of the inwardly flared (or inwardly tapered) surface 35 terminates in a shoulder 36. It will be appreciated that the taper of each portion 34 and 35 is not narrowly critical, no more taper being required than will provide the necessary pressure to clamp the pin body 12b.

As will presently be apparent, it is not essential that the handle H be separate from the pin-clamping means 30, but it conveniently prevents a knurled ring 40 from being accidentally separated from the pin vise if the outside diameter of the handle is greater than the inside diameter of the ring. The inside diameter of the ring 40 is chosen so as to allow pressure to be exerted on the outer surface of the tapered upper portion 34. Therefore the former (inside diameter of the ring 40) is slightly less than the outside diameter of the base 33. The function of the knurled ring 40 is to squeeze the tapered upper portion 34, radially inwardly, sufficiently to enable the pin 12 to be held securely by its body 12b, when the knurled ring is advanced in a downward direction.

The shoulder 36 separates the bottom of the inwardly tapered lower portion 35 from a cylindrical terminal lower portion 37, referred to as a collet, having a lesser diameter than that of the base 33. The collet 37 is provided with a longitudinally axial opening or throat 39, the diameter of which is increased or decreased depending upon the pressure exerted upon the surface of the conical upper portion 34 by the knurled ring 40, or the inward pressure exerted upon the base 33 by the upper sleeve body 41.

To increase or decrease the diameter of the axial opening as stated, with a manually exerted force, the tapered upper and lower portions 34 and 35 are provided with plural longitudinal slots 38 therein, longitudinally of the pin-clamping means 30. These slots 38 extend continuously from the bottom of the collet 37 into the tapered lower and upper portions 34 and 35; and, they extend radially outward from the longitudinal axis to the surfaces of the upper and lower portions 34 and 35 respectively. The slots 38 extend longitudinally as far as is necessary to permit the necessary clamping action, manually. As shown in the drawing, these slots preferably extend to near the upper end of the tapered upper portion 34. A first taper of the dual-tapered portion 32 with the slots 38, tapers from a relatively smaller outside diameter near the top of the tapered upper portion 34, increasing in diameter until the taper terminates in the base 33; and, a second taper of the dual-tapered portion 32 tapers from a relatively smaller outside diameter (than that of the base) at the shoulder 36, increasing in diameter until the taper terminates in the base 33.

The slots 38 thus divide the collet 37 of the pin vise into resilient finger portions which form a resiliently expansible collet. This collet portion of the pin vise is provided with a normally narrow throat or opening 39 which encircles the body portion 12b of the pin 12. The throat 39 is enlarged upon radially outward deflection, or deflection apart, of the finger portions to allow the body portion of a pin to be inserted in the throat. The fingers of the collet are resiliently contractible by pressure exerted by the axial movement of the upper sleeve body 41 having an upper bore 43, in a direction such as to produce a radially inward force sufficient to hold the body portion 12b of the pin snugly. The lower sleeve body 42 has a lower bore 44 which snugly fits over the collet 37.

A pin is typically in the range from about 0.1" to about 0.25" in overall length having a cylindrical body from about 5 mils to about 100 mils in diameter and a head in the range from about 0.02" to about 0.06" in diameter. A pin is typically made of a suitably conductive material, for example, Kovar IASTM F-151.

To produce the desired compressive force on the collet, the upper body 41 of the sleeve 19 is advanced over the head of the pin 12 so that the upper bore 43 snugly encircles the base 33. In this position, shoulder 36 is vertically spaced apart from the bottom of 45 of the upper bore 43, providing a gap G to afford space for the further axial movement (upwards) of the sleeve when an arc is to be struck between the ribbon 16 and the head 12h of the pin 12 by downward pressure on the handle.

The collar 18 has an internal, through-bore 46 which allows the collar to be slidably fitted over the lower portion 42 of the sleeve. The sliding fit is such that the collar is tightly cammed against the lower portion of the sleeve when the ribbon 16 is inserted therebetween. As is more clearly seen in FIGS. 5 and 6, the collar 18 is provided with four longitudinal passages 47 which are circumferentially spaced so as to mate with four pins of the module, adjacent the damaged pin, if the damaged pin is so situated, but mates with at least two pins so as to locate the new pin accurately. The ribbon 16 is inserted in the bore of the collar, between the collar and the outer surface of the sleeve's lower body 42, so that when the collar is forced upwards against the upper sleeve body 41, the ribbon 16 is tightly held in a vise formed by the collar and the stepped sleeve. As can be seen, the end of the ribbon is bent so as to be spaced apart a predetermined distance from the head 12h of the pin 12, this distance being insufficient to strike an arc.

Figure 7:
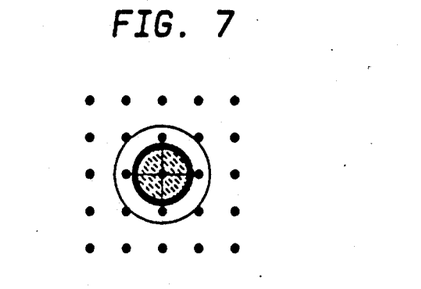
FIG. 7 illustrates the position of a locating collar mated to four adjacent pins and a new pin positioned in the center by the lower portion of the clamp which functions as a collet.

FIG. 7 shows a pin clamped in collet 37 which is tightly closed by pressure from the stepped sleeve 19 shown in phantom outline with its lower body 42 inserted in the collet 37. The knurled ring 40 is shown separate (slid upward) from the stepped sleeve, because its clamping action is done by the stepped sleeve.

As will also now be evident, if desired, the locating collar 18 may be provided with a tapered axial inner bore to secure the terminal portion of the ribbon under the head of the new pin. Similarly, the upper body of the sleeve may be tapered, rather than the outwardly flared lower portion 34, to provide the same net effect. However, one skilled in the art will appreciate that the embodiments disclosed herein are more conveniently made, and represent the most preferred embodiment of the invention.

The ribbon is connected, preferably near its other terminal portion to the negative terminal of the power supply 20. The positive terminal of the power supply is connected to the pin vise 17, preferably at its handle H, and it is necessary that there be electrical connection between the handle H and the pin in the collet.

From the foregoing it will now be seen that it is the relative interaction of the components of the attachment tool which is critical to provide the desired spacing or "gap" G between the head of a new pin and the old base (upon which the bent end of the ribbon rests), before the charge is fired. Such relationship is best provided with the pin vise which is provided with an upper body in electrical contact with a pin-clamping means having a tapered lower body; the tapered lower body terminates in a collet having an axial throat in which the new pin is removably disposed; and, a stepped sleeve means having an upper bore in an upper sleeve body, and a lower bore in a lower sleeve body, the upper bore being dimensioned to provide sufficient radially inward axial pressure when the sleeve is advanced upwards over the pin-clamping means, to snugly secure the new pin.

The knurled ring 40 may be dispensed with if the outwardly tapered portion of the lower body is held with a pliers having appropriately arcuate jaws capable of applying the requisite pressure to hold the pin in place until the stepped sleeve is placed in position.

To use the pin vise, the body 12b of the pin 12 is inserted in the throat 39 and the knurled ring 40 is moved downwards to lock the pin so that its head 12h protrudes a predetermined distance downwards, preferably from about 0.005" to 0.050". The stepped sleeve 19 is then advanced over the pin and tightly pressed upwards as to lock the pin in place and free the knurled ring which may then be slid upward. In this position the lower open end of the lower sleeve body is approximately in the same plane as the head of the pin, and the gap G between the shoulder 36 and the bottom of the upper bore is in the range from about 0.005" to 0.050" corresponding approximately to the protrusion of the head of the pin.

Figure 5:
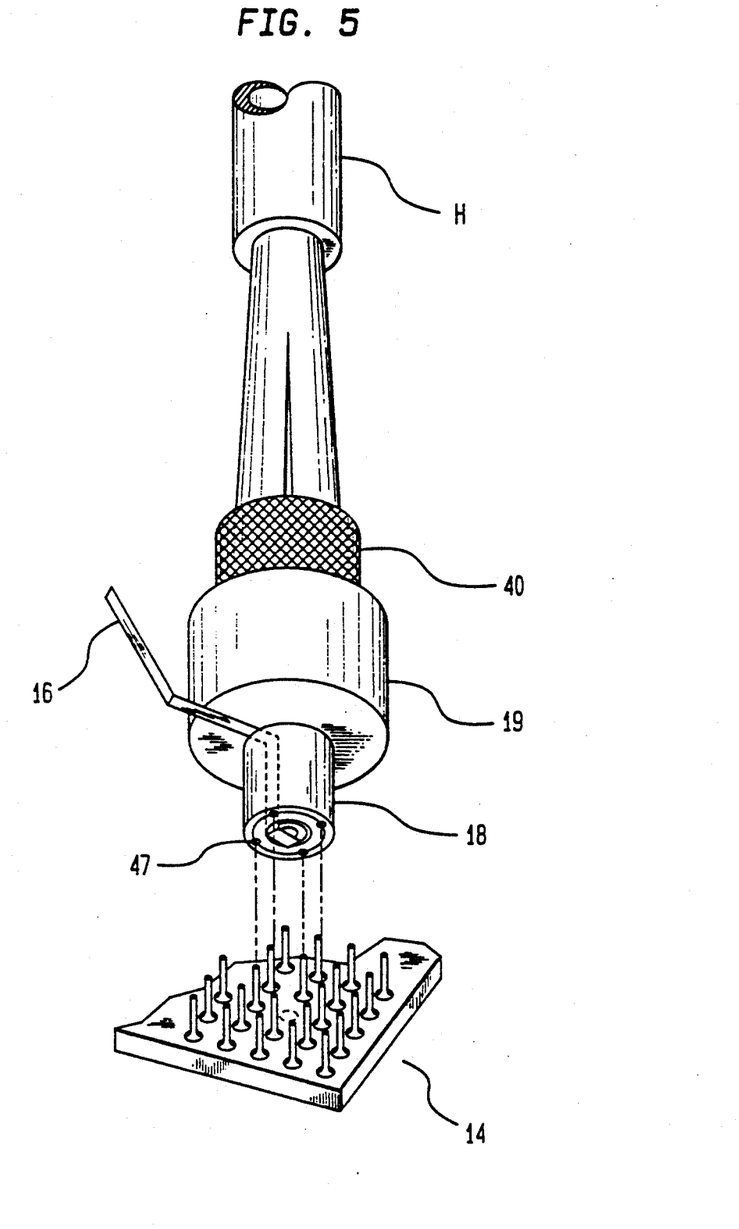
FIG. 5 is an enlarged, more detailed perspective view from underneath the attachment tool, schematically illustrating its overall construction, and the manner in which a Z-shaped ribbon of brazing alloy foil is held relative to a module, before capacitive brazing a new pin to replace a damaged pin.
Figure 6:
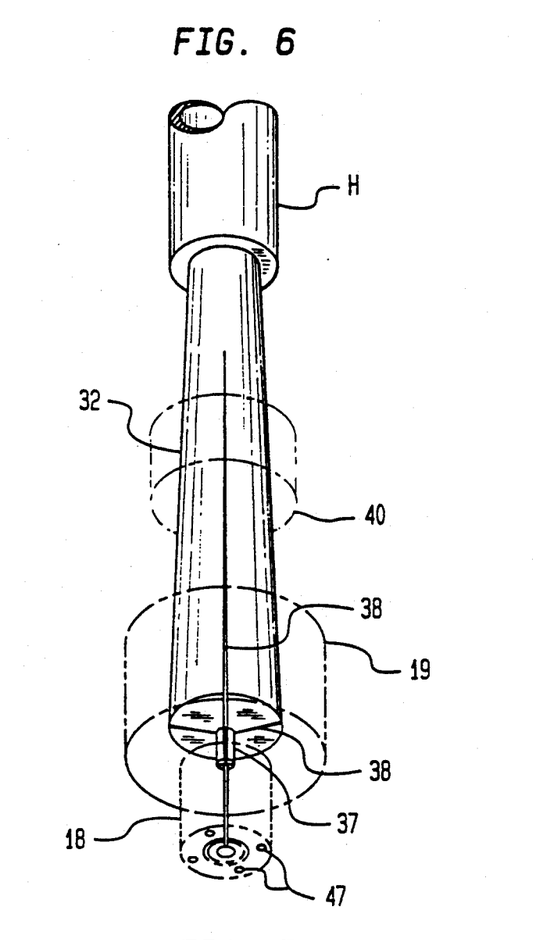
FIG. 6 is an enlarged detail view of the lower portion of the pin vise showing how the pin is held in a pin-clamping means; cooperating components of the pin vise, namely a stepped sleeve, a locating collar, and a knurled ring, which comprise the attachment tool, are shown in phantom outline.

With the head 12h of the pin now protruding the predetermined distance G, the ribbon 16 is bent in a generally Z-shape so as to have one end substantially parallel to the surface of the pin's head. The transverse segment of the Z is locked essentially vertically between the lower sleeve body 42 and the collar 18, when the collar is positioned over the ribbon, and pressed into abutting relationship against the lower surface of the upper sleeve body. In this position the open end of the collar, the open end of the lower sleeve body, and the head of the pin are approximately coplanar. The other end of the ribbon is connected to the negative terminal of the power supply 20.

The collar 18 is then placed around the base of the broken pin, mating with as many of the surrounding undamaged pins of the module as can be found around the broken pin, so that the pin vise is located by the undamaged pins in a vertical position. In position, just prior to firing the charge, the bent end of the ribbon typically rests upon the old base making electrical contact therewith, while the open ends of the collar and the lower sleeve body are just above the substrate being spaced apart therefrom about 0.010" to 0.030", this spacing being dictated by the solder at the base of the undamaged pins. The bent end of the ribbon may also be a short distance above and in close proximity to the old base, this distance being closed when the pin vise is forced down against the bases of the locating pins.

With the current turned on, the handle H is forcibly driven down so that the shoulder 36 is driven down against the bottom 45 of the upper bore of the sleeve, because the bottom of the lower sleeve body 42 is stopped against the upper surface of the module The lower sleeve body encircles the captive head 12h of the new pin which strikes an arc as it comes into contact with the ribbon 16. The new pin 12 is thus secured to the old base by capacitive brazing. The bond of the new pin to the old base is so strong that an attempt to break the bond by pulling upon the pin, severs the substrate rather than break the bond. This bond is observable under magnification with an optical means, but may also be visible to the naked eye.

The construction of the type of module upon which the process of this invention can be carried out is not narrowly critical. As previously intimated, for economic reasons, the process will be practiced mainly on modules which are less expensive to repair than than they are to replace, and the defect is due only to damage to one or more pins.

A typical module is an integrated circuit assembly comprising at least one circuit device such as a chip or other integrated circuit package, mounted on a circuitized substrate having a plurality of through-pins to provide connections via circuit lines from the integrated circuit device. The integrated circuit device is connected to the top of the substrate by a plurality of connections which may be, for example, solder balls. Since these are the only connections between the device and the substrate there is a very limited thermal path therebetween and as a result it is not possible to dissipate a sudden large input of heat into the device. The foregoing general description is provided only to apprise one skilled in the art of the physical structure of a module to which this invention is applied, and the undamaged module itself forms no part of the invention.

When repaired however, the repair being necessitated by a damaged pin which is to be replaced, the repaired module is easily distinguishable from the unrepaired one upon a close examination of the bonds between the pins and the substrates The bond of the new pin to the old base of the damaged pin is evidence that the module was repaired. The repaired module functions in such a way that it is indistinguishable from a similar undamaged module.

Reverting to FIG. 4, the power supply 20 comprises conventional components selected to deliver and fire the desired charge. The energy of the charge is a function of the diameter of the new pin to be brazed, the thickness of the foil used, and the properties of the materials of each, inter alia. For typical pins in a module the charge used will range from about 0.1 coulomb to about 1 coulomb. Under normal conditions the voltage to initiate firing of the charge will be at least about 5 volts, and typically ranges from about 10 to 60 volts, but as much as 100 volts may be used under special circumstances.

The components of a typical circuit include a fuse F1, for example, about 0.5 amp for an isolation transformer T1 such as a Triad N-68-X to step down the line voltage 2:1 which is delivered to the high voltage side of the power supply by plugging in the plug 51 into an appropriate receptacle. In the low voltage side of the power supply a bleeder resistor R3 allows a resistance R1 (typically 100 ohms, 25 watt) and a silicon rectifier (for example a 500 ma 130V) to build up the desired charge in an electrolytic capacitor C1 (e.g. a 8000 MFD, 50VDC). It will be appreciated that the components of the power supply are chosen to satisfy the demands of the type of ribbon used and the type of pin to be brazed to the old pin base.

Having thus clearly and objectively stated the problem to be solved, and its solution by the invention disclosed herein, and having provided a detailed description and illustrations of the best mode of practicing the invention, it is to be understood that no undue restrictions are to be imposed by reason thereof, and particularly that the invention is not restricted to a slavish adherence to the details set forth herein.

We claim:

1. A method for replacing a damaged pin, separated near its base from the substrate in a module for an integrated circuit assembly including at least one circuit device mounted on a circuitized substrate, with a new pin, said method comprising,
    (a) locating a terminal portion of a ribbon of brazing alloy above and in close proximity to said base,
    (b) matingly locating undamaged pins in said module to position the head of said new pin above said terminal portion of said ribbon,
    (c) establishing an electrically conductive path from said ribbon to one terminal of a power supply,
    (d) establishing an electrically conductive path from said new pin to the other terminal of said power supply,
    (e) maintaining the head of said new pin and said terminal portion of said ribbon at a distance insufficient to fire a capacitive charge stored in said power supply, and,
    (f) decreasing said distance so as to fire said charge, while leaving said old base out of the circuit for firing said charge,
whereby said ribbon is melted, brazing the head of said new pin to said old base without damaging said integrated circuit.

2. The method of claim 1 wherein step (c) includes establishing said electrically conductive path from said ribbon to the negative terminal of said power supply, and step (d) includes establishing said electrically conductive path from said new pin to the positive terminal of said power supply.

3. The method of claim 2 wherein said new pin has a diameter in the range from about 5 mils to about 100 mils; said ribbon is from about 1 mil to about 20 mils thick, and said charge has an energy in the range from about 0.1 coulomb to about 1 coulomb.

4. The method of claim 2 wherein said module includes plural circuit devices mounted on said circuitized substrate.

5. An attachment tool for attaching a new pin to a base of an old pin removed from a circuitized substrate in a module for an integrated circuit assembly including at least one circuit device mounted on said substrate, comprising,
(a) a pin vise comprising an upper body in electrical contact with a pin-clamping means having a dual-tapered lower body terminating in a clamping means having an axial throat in which said new pin is removably disposed;
(b) a stepped sleeve means having an upper bore in an upper sleeve body, and a lower bore in a lower sleeve body, said upper bore being dimensioned to provide sufficient radially inward axial pressure when said sleeve is advanced upwards over said pin-clamping means, to snugly secure said new pin; and,
(c) a locating collar having an internal through-bore within which said pin-clamping means is slidably inserted, said collar being provided with at least two longitudinal passages circumferentially spaced-apart so as to mate with at least two pins.

6. The pin attachment tool of claim 5 wherein said dual-tapered portion is oppositely tapered above and below a base, forming an outwardly tapered upper portion and a inwardly tapered lower portion, each of which portions is gently flared inward and outward, respectively, from the circumference of the base.

7. The pin attachment tool of claim 6 wherein said pin vise includes a ring slidably disposed upon said upper body, the inner diameter of said ring being adapted to exert sufficient radially inward axial pressure when said ring is advanced downwards over said upper body, to snugly secure said new pin.

8. The pin attachment tool of claim 6 wherein said pin vise is electrically conductive, and said stepped sleeve and said locating collar are electrically insulating.

9. The pin attachment tool of claim 8 wherein said locating collar and lower body of said stepped sleeve are adapted to snugly secure a ribbon of brazing alloy therebetween.

10. A repaired module for an integrated circuit assembly including at least one circuit device mounted on a circuitized substrate, said module having at least one pin which is a replacement or new pin which has been attached to the substrate by capacitive brazing said new pin to the base of a damaged pin separated near its base from said substrate, said new pin being identifiable by a bond fixedly securing said new pin to said base, said bond being visible by microscopic examination of said base.

11. The repaired module of claim 10 wherein said new pin has a diameter in the range from about 5 mils to about 100 mils.

12. The repaired module of claim 11 wherein said bond is generated by firing a charge having an energy in the range from about 0.1 coulomb to about 1 coulomb between said new pin and a ribbon of brazing alloy.

13. The repaired module of claim 12 wherein said ribbon is from about 1 mil to about 20 mils thick.

14. A system for replacing a damaged pin, separated near its base from the substrate in a module for an integrated circuit assembly including at least one circuit device mounted on a circuitized substrate, with a new pin, said system comprising,
(a) an attachment tool for attaching a new pin to a base of an old pin removed from said substrate,
(b) a ribbon of brazing alloy, a terminal portion of said ribbon being located above and in close proximity to said base,
(c) a power supply to provide a stored electrical charge having sufficient energy to melt said terminal portion of said ribbon when said charge is fired,
(d) a first conductive means to establish an electrically conductive path from said ribbon to one terminal of said power supply, and,
(e) a second conductive means to establish an electrically conductive path from said new pin to the other terminal of said power supply,
whereby said ribbon is melted when said charge is fired, so as to braze the head of said new pin to said old base without damaging said integrated circuit.

15. The system of claim 14 wherein said first conductive means provides said electrically conductive path from said ribbon to the negative terminal of said power supply, and, said second conductive means provides said electrically conductive path from said new pin to the positive terminal of said power supply.

16. The system of claim 15 wherein said new pin has a diameter in the range from about 5 mils to about 100 mils; said ribbon is from about 1 mil to about 20 mils thick, and said charge has an energy in the range from about 0.1 coulomb to about 1 coulomb 17. The system of claim 16 wherein said module includes plural circuit devices mounted on said circuitized substrate.

* * * * *